United States Patent
Schmitt

(10) Patent No.: US 6,565,297 B2
(45) Date of Patent: May 20, 2003

(54) METHOD OF MILLING LARGE THREAD LENGTHS

(76) Inventor: M. Norbert Schmitt, Schwalbenweg 3, D-90537 Feucht (DE)

( * ) Notice: Subject to any disclaimer, the term of this patent is extended or adjusted under 35 U.S.C. 154(b) by 103 days.

(21) Appl. No.: 09/756,823

(22) Filed: Jan. 9, 2001

(65) Prior Publication Data

US 2001/0020406 A1 Sep. 13, 2001

Related U.S. Application Data

(63) Continuation-in-part of application No. 09/293,499, filed on Apr. 15, 1999.

(30) Foreign Application Priority Data

Apr. 17, 1998 (DE) .......................... 198 17 018

(51) Int. Cl.⁷ .............................. B23B 1/00; B26D 1/12
(52) U.S. Cl. ......................... 409/66; 409/131; 82/1.11; 82/1.4
(58) Field of Search ........................... 409/66, 65, 131, 409/74; 407/20, 24, 25, 61; 82/1.11, 1.4; 470/198, 199; 408/222

(56) References Cited

U.S. PATENT DOCUMENTS

| | | | | |
|---|---|---|---|---|
| 1,140,130 A | * | 5/1915 | Dies | 407/24 |
| 1,202,195 A | * | 10/1916 | Lees | 407/24 |
| 3,945,069 A | * | 3/1976 | Cecil | 408/16 |
| 4,355,766 A | * | 10/1982 | Wigand | 241/222 |
| 5,678,962 A | * | 10/1997 | Hyatt et al. | 408/222 |
| 6,012,882 A | * | 1/2000 | Turchan | 408/222 |

FOREIGN PATENT DOCUMENTS

| | | | | |
|---|---|---|---|---|
| FR | 000483492 A | * | 7/2002 | 470/198 |
| GB | 000005396 A | * | 4/2002 | 470/198 |

* cited by examiner

Primary Examiner—Henry W. H. Tsai
(74) Attorney, Agent, or Firm—Sidley Austin Brown & Wood, LLP

(57) ABSTRACT

A method of milling a large thread length with a thread milling cutter having a shank and a milling section having a plurality of rows of teeth arranged in each row one after another with at least two adjacent teeth in each row being separated, in an axial direction by a missing tooth space, with the method including positioning the cutter in a bore of a workpiece, with the cutter being adjusted in an axial direction and fed outwardly, forming a portion of the thread by imparting to the cutter rotational, axial feeding, and circular movements, and forming a further portion of the thread by imparting to the cutter a further circular movement corresponding to the tooth missing space, while continuing to impart to the cutter rotational and axial feeding movement.

8 Claims, 3 Drawing Sheets

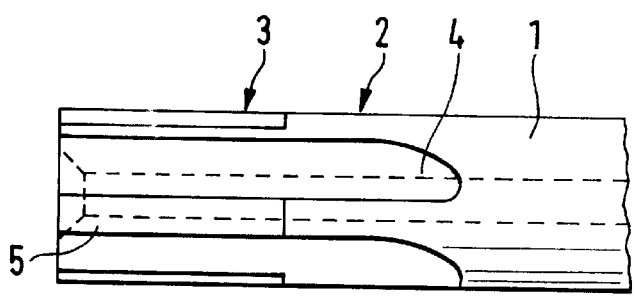
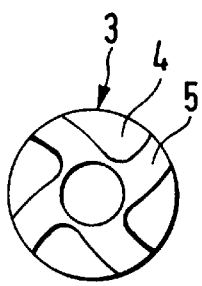
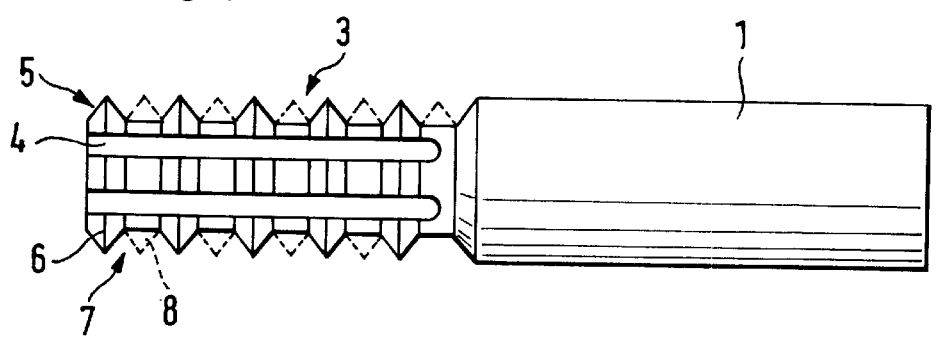
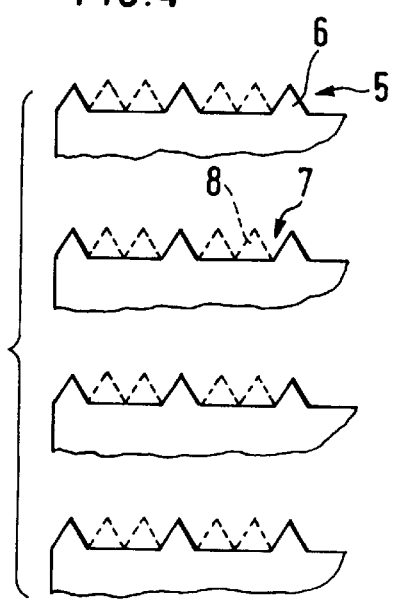
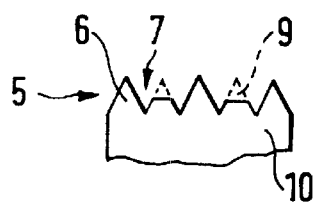
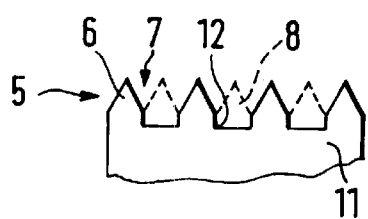

METHOD OF MILLING LARGE THREAD LENGTHS

RELATED APPLICATION

This application is a continuation in-part of application Ser. No. 09/293,499, filed Apr. 15, 1999.

BACKGROUND OF THE INVENTION

1. Field of the Invention

The present invention also relates to a method of forming a large thread length with thread milling cutter including a shank to be received in a spindle of a machine-tool, and a milling region adjoining the shank at a front end of the shank and including a plurality of rows of teeth extending parallel to each other with the rows of teeth being separated by locking grooves, with the method including a single positioning of the cutter in a bore of a workpiece, adjusting the cutter in an axial direction and feeding it outwardly, and forming the thread by imparting to the cutter a rotational movement, a feeding movement, and a circular movement.

2. Description of the Prior Art

A thread milling cutter of the type described above is well known and is characterized by a uniform distribution of teeth in each row, with all of the teeth. having a complete profile. The length of the milling region corresponds to the large thread length to be formed in a workpiece. The complete profile thread milling teeth are arranged at a distance of pitch P of the to-be-formed thread. The thread milling cutter engages the workpiece along the entire length of its milling region and the thread is formed only by the circular movement. In this case, an increased bending torque acts on the cutter, which can result in the breaking of the cutter.

Also known are thread milling cutters the length of the milling region of which is smaller than the length of a to-be-formed thread, with the teeth still being uniformly distributed in each row and having each a complete profile. This thread milling cutter with a reduced length of the milling region, after forming a portion of a thread and effecting a circular movement, should be repositioned, with an additional circular movement being imparted to the cutter while imparting to it rotational and feeding movements, for forming a further portion of the thread. The repositioning consumes additional or auxiliary time. This is, of course, a drawback, as the additional time increases the manufacturing costs.

Accordingly, an object of the present invention is an improved method of milling large thread length which permits to reduce bending or flexural torque acting on the cutter and to reduce the auxiliary time during forming a thread.

SUMMARY OF THE INVENTION

This and other objects of the present invention, which will become apparent hereinafter, are achieved by using a thread milling cutter having a milling section the length of which correspond to the length of the to-be-formed thread and in which at least two adjacent teeth in each row are separated, when viewed in the axial direction of the cutter, by at least one missing tooth space.

With this thread milling cutter, there is no engagement of the missing tooth (teeth) with the workpiece. Therefore, the bending torque, which is caused by the engagement of the milling teeth with the workpiece, is reduced. At that, the additional time necessary for repositioning a cutter, when a cutter with a milling section having a reduced length is used, becomes unnecessary, as an entire length of the thread can be milled. When a first portion of a thread is formed by two teeth, immediately following one another, both are loaded in the same way, while during the formation of the further portion of two immediately following one another teeth, only that tooth, is loaded, which follows in the feeding direction of the circular movement, the missing tooth space.

With the thread milling cutter used according to the present invention, even with several circular movements of the cutter, the only auxiliary time necessary is the time necessary for initial positioning of the cutter which results in with a reduced production time, which is accompanied by reduced manufacturing costs. When conventional thread milling cutters are used, a tangential entry revolution is necessary for dipping of the cutter into the workpiece by an amount of the thread profile depth, and a disengagement revolution is necessary for a clean negotiation of the milled thread grooves. The entry and disengagement revolutions are associated with increased production time. With the thread milling cutter according to the invention, the entry and disengagement revolutions are not necessary.

A thread million cutter, as a rule, is designed only for thread milling However, it is also possible to form a thread milling cutter according to the invention, as a milling and drilling tool having, at its foot end, drilling bits. In this case, the thread milling cutter can be both automatically positioned upon formation of a bore, and positioned in a pre-formed bore. As a rule, each row of teeth has at least one missing tooth space. Missing tooth space means that a gap is formed between two milling teeth with the gap size corresponding to the dimensions of a milling tooth.

In the thread milling cutter used according to the present invention, the locking grooves can be rectilinear and extend parallel to the cutter axis. As a rule, however, the locking grooves are twisted or have a spiral shape because, together with the formation of gaps between the teeth, the effectiveness of the cutter with twisted locking grooves is improved. The number of the locking grooves or the number of teeth rows is irrelevant for the purposes of the invention and can be arbitrarily selected.

In the used thread milling cutter, in all rows of teeth, the corresponding teeth and the corresponding missing tooth spaces are provided at the same axial positions so that the corresponding teeth lie on a circle the plane of which extend at a right angle to the longitudinal axis of the cutter.

The present invention provides a method of milling large thread lengths which includes providing a thread milling cutter having a milling region the length of which corresponds to the length of the to-be-milled thread and which includes a plurality of rows of teeth which extend parallel to each other, and locking groove means separating the rows of teeth, with the teeth of all of the plurality of rows being arranged in each row one after another, and with at least two adjacent teeth in each row being separated, when viewed in at least one of an axial direction and a circumferential direction, by at least one missing tooth space. The method further includes single positioning of the thread milling cutter in a bore of a workpiece in which the thread is to be milled, with the. cutter being adjusted in an axial direction and fed outwardly, forming the thread by imparting to the cutter rotational feeding and circular movements, and imparting to the cutter, after a circular movement following the single positioning, without repositioning the cutter, an additional circular movement which corresponds to a tooth missing space while the cutter is imparted rotational and feed movements.

However, providing a missing tooth space between two adjacent teeth in each row is not the only important feature of the present invention. It is also important that each tooth, after a positioning, performs its function not only at one complete turn of the circular movement, but also at further complete turns of the circular movement the number of which should correspond to a number of missing teeth in a missing tooth space between two adjacent complete profile teeth. According to the present invention, each tooth is displaced, per each turn of the circular movement, by an axial distance p which corresponds to the distance between a complete profile tooth and the adjacent "missing" tooth. Thus, with the missing tooth space corresponding to one missing tooth, the tooth is displaced over an axial distance 2p.

In the cutter according to one embodiment of the present invention, in each row of teeth, a missing tooth space follows, when viewed in the feeding direction, only one full-profile teeth. However, it is particularly preferable and advantageous when in each row of teeth, a missing tooth space follows, when viewed in the feeding direction, several full-profile teeth. The followed full-profile teeth, if having been worn too much, can be grounded down.

It is further particularly preferable and advantageous when the missing tooth space extends over the entire extension of a missing tooth. In this way, the missing tool space provides for a most possible relief of the thread milling cutter.

It is further preferable and advantageous when the missing tooth space extend over a width of a peak portion of a tooth which amounts at least to 50% of the tooth height. This design is preferred when only a partial relief of the tool is desired. The use of a thread milling cutter with the above-described missing tooth space prevents burr formation in the produced thread.

It is further particularly preferable and advantageous when the missing tooth space has a groove formed in the body of the tool. This groove increases the space between two teeth which limits the missing tooth space. The recessed groove favorable influences formation of sharp free ends of the thread.

It is possible to provide a single missing tooth space in a row of teeth. However, it is particularly preferable and advantageous when each row of teeth has, when viewed in the axial direction, several missing tooth spaces. This contributes to the formation of a tool with a milling or working region having a greater length.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows schematically a side view of a portion of a first embodiment of a thread milling cutter used in accordance with the present invention for large thread lengths;

FIG. 2 shows an end view of the thread milling cutter shown in FIG. 1;

FIG. 3 shows schematically a side view of a portion of a second embodiment of a thread milling cutter used in accordance with to the present invention for large thread lengths;

FIG. 4 shows a view showing several rows of teeth of a thread milling cutter used in accordance with large thread lengths;

FIG. 5 shows a view showing only a partial tooth removal;

FIG. 6 shows a view showing a complete tooth removal with formation of recessed grooves in the bottom area of a removed tooth;

DETAILED DESCRIPTION OF THE PREFERRED EMBODIMENT

Figure 4A:
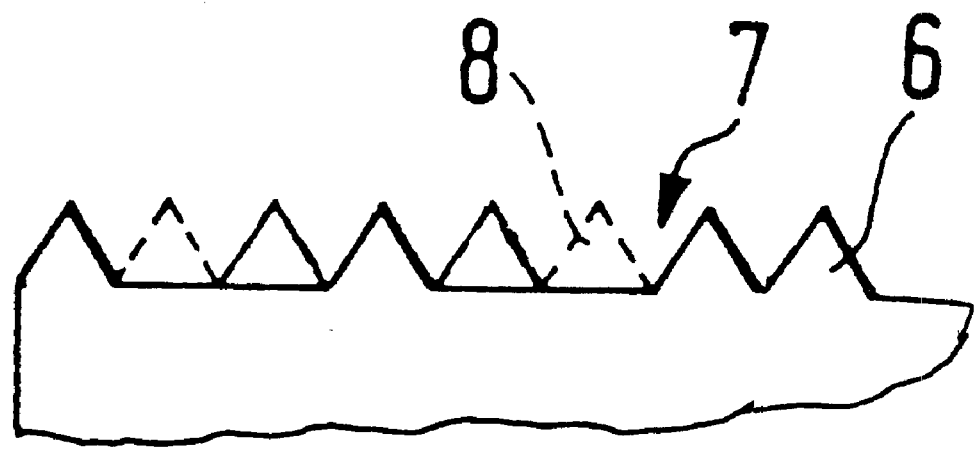
FIG. 4A shows a view showing a row of teeth of a third embodiment of a thread milling cutter according to the present invention.

A thread milling cutter, which is used in accordance with the present invention and which is shown in FIGS. 1–3, includes a shank 1 to which a thread milling section 3 is attached, either directly or with an intermediate member 2. The thread milling section 3 is provided with locking grooves 4 between which rows 5, which are not shown completely, of thread milling cutter teeth 6 extend. In FIG. 3, reference numeral 7 shown a space which should have been occupied by teeth 8, which have been removed. The missing teeth 8 are shown with dash lines. In FIG. 3, every other milling cutter tooth is removed. In the embodiment shown in FIG. 3, in each row 5 of the thread milling cutter teeth 6, the spaces 7 are formed at the same axial locations and have the same height which correspond to missing teeth. The missing tooth space 7 is provided after each tooth 6, and each space 7 correspond to a space which would have been occupied by a single missing thread milling cutter tooth.

FIG. 4 shows four rows 5 of thread milling cutter teeth 6 of a portion of another embodiment of a thread milling cutter used in accordance with the present invention. In each row 5, there is a missing tooth space 7 between each two cutter teeth 6. The missing tooth space 7 corresponds to a space which would have been occupied by two removed teeth 8 which are shown with dash lines. Likewise here, the tooth spaces 7 are formed in the same axial locations and have the same height corresponding to missing teeth. In the embodiment of FIG. 4A, a plurality of complete cutter teeth 6 follows a missing tooth space 7. In the embodiment of FIG. 5, the tooth space 7 corresponds to a space which would have been occupied by front or upper portion 9 of a tooth shown with dash lines.

In the embodiment of FIG. 5, a tooth 10 remains. In the embodiment of FIG. 6, the missing teeth 8, which are shown with dash lines, are removed completely, and the missing tooth spaces 7 have recessed grooves 12 formed in the body of the thread milling cutter.

Figure 8:
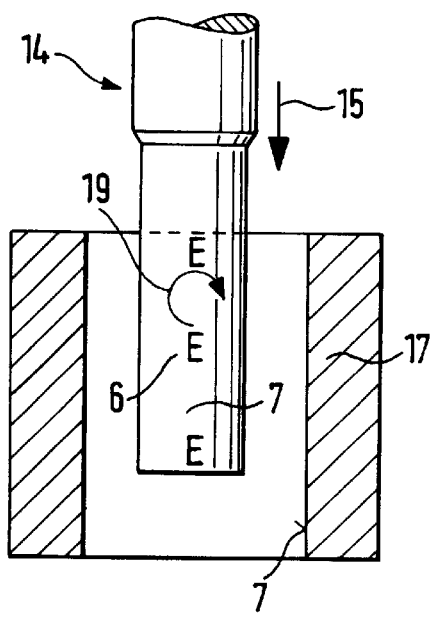
FIG. 8 shows a side cross-sectional view showing the position of a thread milling cutter according to the present invention in a workpiece, the end view of which is shown in FIG. 7.
Figure 7:
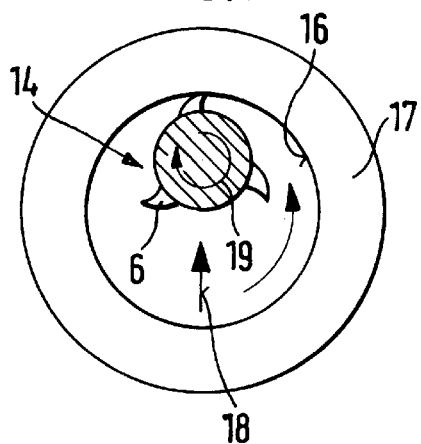
FIG. 7 shows an end view showing a portion of a thread milling cutter according to the present invention in a workpiece.

As shown in FIGS. 7–8, the inventive thread milling cutter 14 is inserted, as shown by arrow 15, in a bore 16 of a workpiece 17 and then is brought, as shown by arrow 18, in a radial direction into a predetermined position. The thread milling cutter is constantly rotated clockwise, as shown by arrow 19. The thread milling cutter 14, has, viewed in the axial direction, three cutter teeth 6, with each two adjacent cutter teeth 6 being separated by a missing tooth space 7. In addition to the translational and rotational movements, as discussed above, the thread milling cutter 14 also performs from a turning point, a circular or orbital movement in a counterclockwise direction, with each cutter teeth 6 being movable along a spiral orbit, as shown by spiral lines 20 and 21 (FIGS. 9–10).

Figure 9:
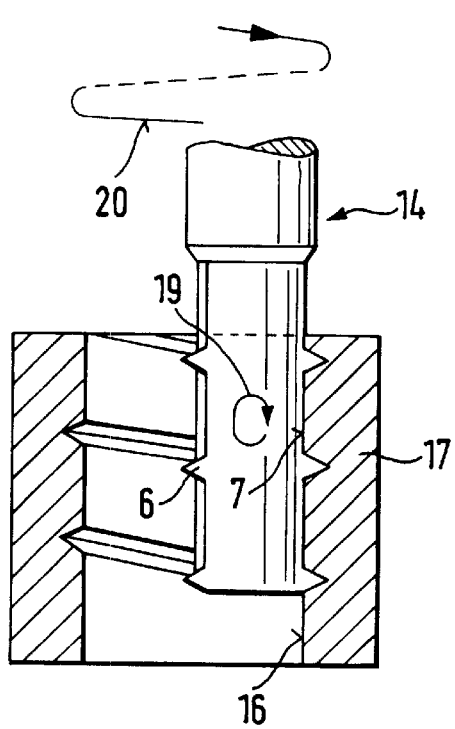
FIG. 9 shows a view similar to that of FIG. 8 but after a first circular movement of the cutter.
Figure 10:
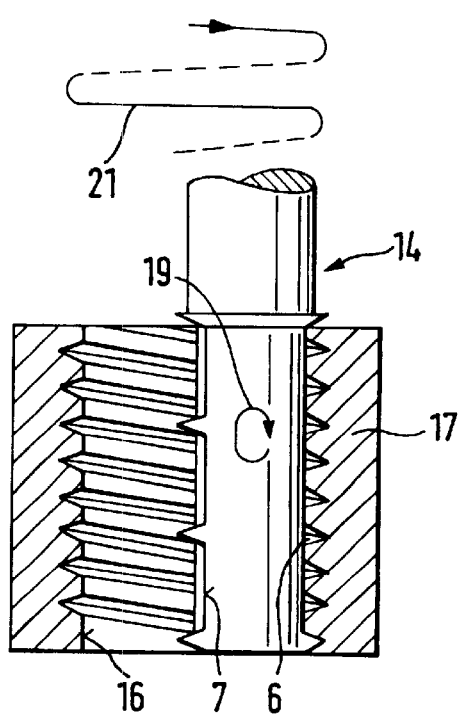
FIG. 10 shows a view similar to that of FIG. 9 but after additional circular movement of the cutter.

FIGS. 9–10 show consecutive steps of forming a large thread length. After the milling cutter 14 has been positioned in the bore 16 of the workpiece 17, the thread milling cutter 14 is imparted a rotational, translational, and circular movements, as discussed above. At the end of the first complete orbital movement, a portion of a thread length is formed, as shown in FIG. 9, with the adjacent thread turns being separated by a space corresponding to the missing tooth (teeth) space. Then, without repositioning the thread milling cutter, further orbital movement is imparted to the thread milling cutter 14 from a different turning point, while the thread missing cutter 14 being imparted with rotational and translational movements. Upon advance of the thread milling cutter 14, the missing thread turns are formed by further located teeth, while the first teeth form following spaced thread turns. As discussed above, the length of the thread milling section 3 of the thread milling cutter 14 corresponds to the length of the formed thread, so that a complete thread profile is formed at the end of the thread milling process, as shown in FIG. 15.

Through the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A method of milling a large thread length, comprising the steps of:

providing a thread milling cutter having a shank to be received in a spindle of a machine tool, and a milling section adjoining the shank at a front end of the shank, having a length corresponding to a length of the to-be-milled thread and including a plurality of rows of teeth, which extend parallel to each other and are separated by locking grooves, with the teeth of each of the plurality of rows being arranged one after another in an axial direction of the cutter, with at least two adjacent teeth in each row being separated by at least one missing tooth space, and with corresponding teeth of all of the plurality of rows lying on an circle a plane of which extends perpendicular to a longitudinal axis of the cutter;

positioning the thread milling cutter in a bore of a workpiece in which the thread is to be milled, with the cutter being adjusted in an axial direction and fed outwardly;

forming a portion of the thread by imparting to the cutter a rotational movement, an axial feeding movement, and a circular movements; and forming a further portion of the thread by imparting to the cutter, without repositioning the cutter, a further circular movement, with a number of turns of the further circular movement corresponding to a number of missing teeth in space between two adjacent cutting teeth, while the cutter is being imparted with rotational and axial feeding movements, whereby a complete thread is formed at an end of a milling process.

2. The method as set forth in claim 1, where the milling cutter providing step includes providing a cutter in which in each row of teeth a plurality of complete cutter teeth follow a missing tooth space.

3. The method as set forth in claim 1, wherein the milling cutter providing step includes providing a cutter in which the missing tooth space extends over an entire wide of a missing cutter tooth.

4. The method as set forth in claim 1, wherein the milling cutter providing step includes providing a cutter in which the missing tooth space occupies a volume corresponding to a peak of the cuter tooth which occupies at least 50% of a tooth height.

5. The method as set forth in claim 1, wherein the milling cutter providing step includes providing a cutter in which a body of the cutter has, in a region of the missing tooth space, a recessed groove.

6. The method as set forth in claim 1, wherein the milling cutter providing a step includes providing a cutter in which, viewed in an axial direction, a plurality of missing tooth spaces are formed in each of the plurality of rows.

7. The method as set forth in claim 1, wherein the milling cutter providing step includes providing at least one missing tooth space between each pair of adjacent teeth.

8. A method of milling a large thread length, comprising the steps of:

providing a thread milling cutter having a shank to be received in a spindle of a machine tool, and a milling section adjoining the shank at a front end of the shank, having a length corresponding to a length of the to-be-milled thread and including a plurality of rows of teeth, which extend parallel to each other and are separated by locking grooves, with the teeth of each of the plurality of rows being arranged one after another in an axial direction of the cutter, with at least two adjacent teeth in each row being separated, by at least one missing tooth space, and with corresponding teeth of all of the plurality of rows lying on an circle a plane of which extends perpendicular to a longitudinal axis of the cutter;

positioning the thread milling cutter in a bore of a workpiece in which the thread is to be milled, with the cutter being adjusted in an axial direction and fed outwardly;

forming a portion of the thread by imparting to the cutter rotational, axial feeding and circular movements; and forming a further portion of the thread by imparting to the cutter a further circular movement, which corresponds to the tooth missing space, while the cutter is being imparted with rotational and axial feeding movements, with each tooth being axially displaced, per each turn of the further circular movement, by an axial distance corresponding to a missing tooth space, whereby a complete thread is formed at an end of a milling process.

\* \* \* \* \*